Figure 1:
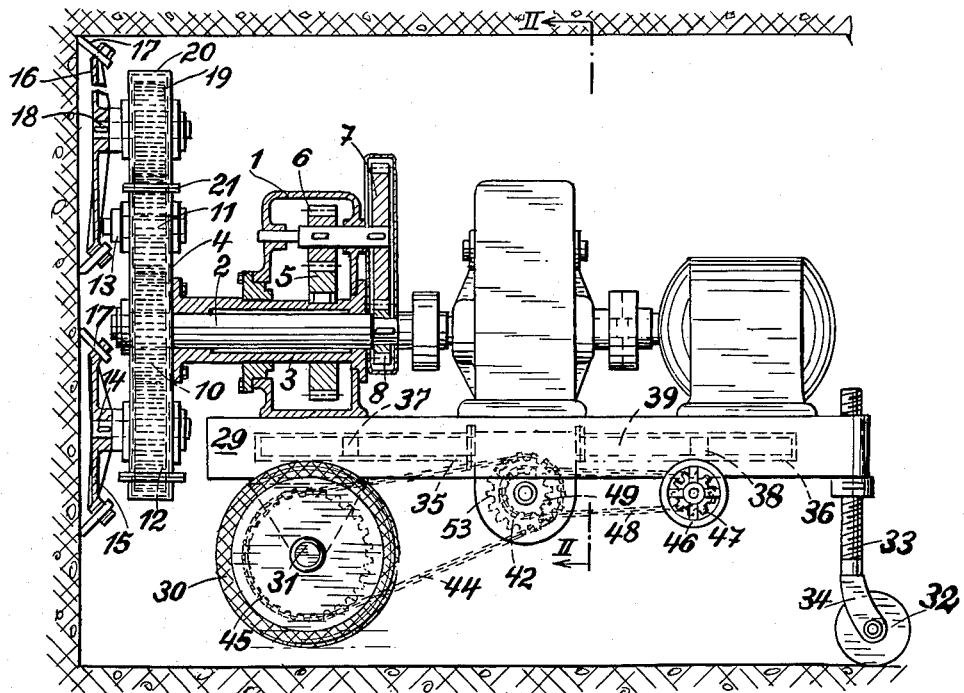

Oct. 17, 1961 S. L. SIK 3,004,753
TUNNEL BORING MACHINE HAVING OPPOSITELY ROTATING
TOOL HOLDERS ON A ROTATING CARRIER
Filed Jan. 22, 1958 3 Sheets-Sheet 1

INVENTOR.
Sigmund Leopold Sik
BY
Michael S. Striker
Attorney

Oct. 17, 1961 S. L. SIK 3,004,753
TUNNEL BORING MACHINE HAVING OPPOSITELY ROTATING
TOOL HOLDERS ON A ROTATING CARRIER
Filed Jan. 22, 1958 3 Sheets-Sheet 3
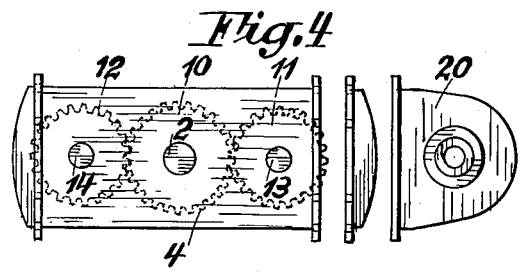
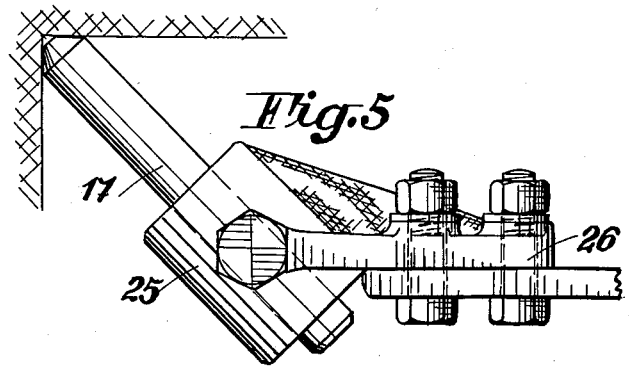
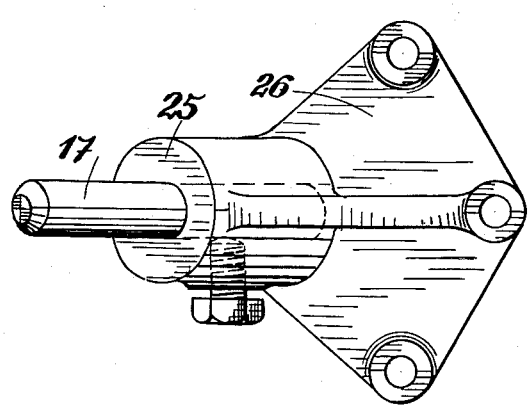
INVENTOR.
Sigmund Leopold Sik
BY Micheal S. Striker
Attorney

United States Patent Office 3,004,753
Patented Oct. 17, 1961

3,004,753
TUNNEL BORING MACHINE HAVING OPPOSITE-
LY ROTATING TOOL HOLDERS ON A ROTAT-
ING CARRIER
Sigmund Leopold Sik, Paffrathgasse 6,
Vienna II, Austria
Filed Jan. 22, 1958, Ser. No. 710,539
Claims priority, application Austria Feb. 4, 1957
1 Claim. (Cl. 262—7)

This invention relates to a tunnel boring machine for boring tunnels of circular cross-section in coal and adjacent rock. The machine comprises a single circular tool holder or a plurality of such tool holders carried one beside the other on a common rotatably arranged carrier, and the tool holders are connected to the drive by a set of gear-wheels which are carried in the carrier and driven by a central main shaft whereas the carrier is firmly connected to a hollow shaft which surrounds the main shaft and is rotated thereby by means of a reducer gear to rotate the carrier with the circular tool holders in a circle around the main shaft. It is known to use in such machines a carrier of predetermined size, which moves circular tool holders of equal size, which are equally spaced from the main shaft, in a circle around said main shaft, the circular tool holders rotating in the same sense so that they apply a unilateral load to the carrier. The equal radial spacing of the shafts of the circular tool holders from the main shaft restricts the diameter of the circular tool holders and the range of the tools. For this reason additional chisel tools are rigidly affixed to these carriers for working material out of the tunnel wall outside the range of the circular tool holders in order to enlarge the cross-section of the tunnel. This arrangement does not provide a satisfactory solution to the problem of varying the working range of the tools because for each enlargement of the range it is necessary to affix on the hollow shaft a larger carrier, the circular tool holders of which are spaced by a larger distance from the central axis.

One of the objects of the present invention is to increase the capacity of such tunnel boring machines and to enable them to be adapted to different tunnel cross-sections. Moreover, a selection of the circular tool holders should enable an adaptation to the respective kind of rock in such a manner that the working speed is variable.

This object is realized according to the invention in that the two circular tool holders of a carrier are carried rotatably and, if desired, for axial movement by the carrier with different radial distances between the axes of said tool holders and the main shaft and that the circular tool holders are driven by the idler wheels in mutually opposite senses of rotation in such a manner that the torques exerted by the rotating circular tool holders on the slowly rotating carrier at least partly offset each other.

For the selective use of circular tool holders of different size it is important, in a development of the invention, that the casing like carrier can be closed at its ends by detachably affixed cover caps, which may be provided with an idler wheel and a shaft, if desired, and that the casing cap provided with a gear-wheel serves also as a bearing for the shaft of one circular tool holder. This construction of the carrier has the purpose of providing the tool carrier with an additional circular tool holder, which has a larger working diameter and range and is carried by the carrier at a larger radial distance from the main shaft than the permanently installed circular tool holder. The greater the radial distance of the additional circular tool holder from the main shaft, the greater is the range with which the machine can be provided because the additional circular tool holder is independent of the circular tool holder which is carried in a stationary position in the carrier.

Figure 2:
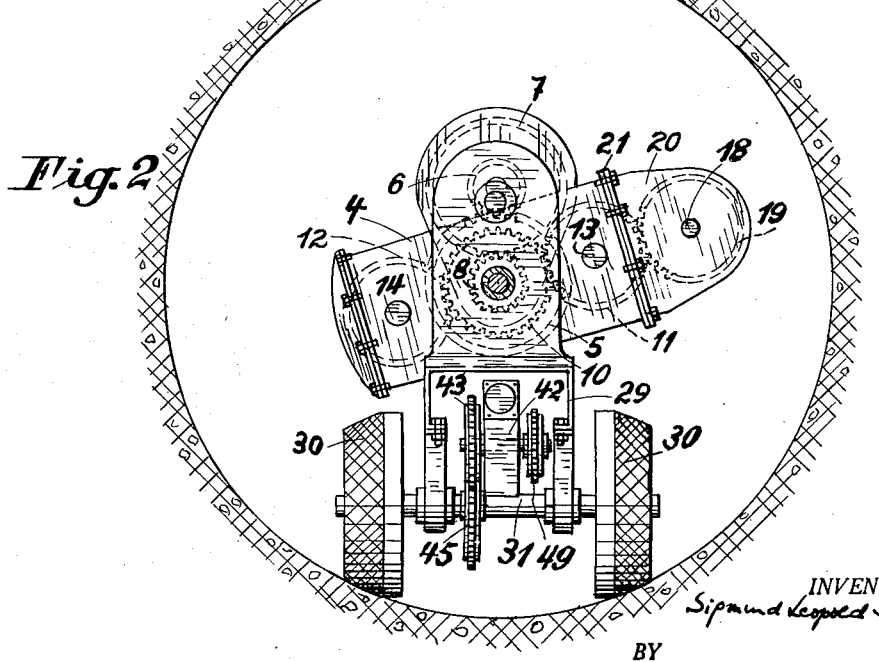
Figure 3:
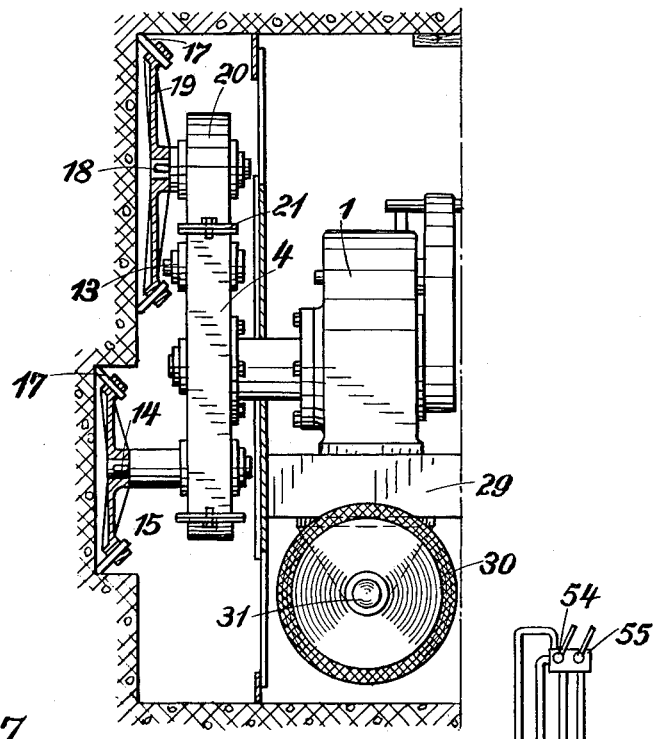
Figure 7:
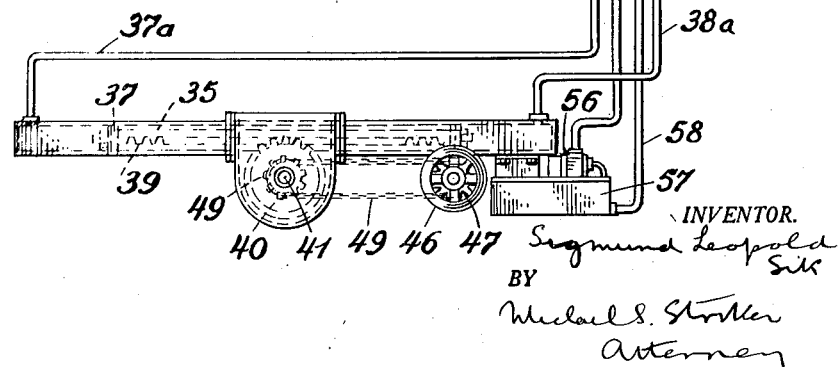

The tunnel boring machine constructed according to the invention is shown in the drawing in an illustrative embodiment showing features necessary for understanding the invention. FIG. 1 is a view partly in longitudinal section and FIG. 2 is an end view showing the circular tool holders and the carrier. FIG. 3 is a view in longitudinal section of another embodiment. FIG. 4 is an elevation of the carrier with the cover cap removed. A support for the circular tool holders is shown in elevation in FIG. 5 and in plan in FIG. 6. FIG. 7 is a diagrammatic view of the hydraulic feeding mechanism.

The essential features of the invention relate to the carrier and the tools. The transmission for the carrier and its set of gear-wheels comprises a main shaft 2 (FIG. 1), which is rotatably carried by a bearing stand 1 and on which a hollow shaft 3 is freely rotatably mounted. A narrow carrier 4, in the form of a casing which encloses a gear-wheel transmission, is affixed to one end of the hollow shaft 3. The hollow shaft 3 has a gear-wheel 5 affixed thereto, which is connected by the gear-wheels 6, 7 of a reducer gear or change gear to a driving gear-wheel 8 of the main shaft 2 or to the drive 9 thereof to impart a slow rotation to the carrier 4. The gear train (FIG. 4) arranged in the carrier 4 consists of a gear-wheel 10 affixed to the main shaft 2 and, e.g., two gear-wheels 11 and 12 meshing with the gear wheel 10 and carried by shafts 13, 14 rotatably carried by the carrier 4 at a radial distance from the main shaft.

Circular tool holders 15, 16 (FIG. 1) are used for coal cutting. Each of these tool holders is provided with a circular set of chisels 17 and has a hub affixed to a shaft 14 or 18. The tool holder 15 carried by the shaft 14 is rotated by the gear-wheel 12 and its tools 17 remove fragments of rock in a range which extends as far as to the main shaft 2. The other tool holder 16 is coupled by its shaft 18 to a gear-wheel 19, which is carried by a casing cap 20, which is detachably affixed to one end of the carrier 4 by means of a flange 21. The gear-wheel 19 meshes with the planetary gear 11 and is rotated in a direction opposite to the direction of rotation of the gear-wheel 12 of the tool holder 15. As a result, the two tool holders 15, 16 work in mutually opposite senses of rotation so that the lever moments exercised by the tools on the carrier partly offset each other. The range of the tool holder 16 extends considerably beyond the carrier cap 20 and extends in the direction toward the main shaft as far as to the working range of the tool holder 15. The chisels 17 extend from the tool holders 15, 16 outwardly at an angle of about 45° with respect to the plane of the tool holder so that they can effectively penetrate the rock. The two tool holders 15 and 16 are rotated in mutually opposite directions by the main shaft 2 and the gear-wheels 10 to 12 and 19 and, by the simultaneous rotation of the hollow shaft 3, are moved by means of the carrier 4 in a circle around the main shaft 2. In this operation the tool holder 15 cuts fragments from the rock in the form of a disc which is centered with respect to the cross-section of the tunnel whereas the tool holder 16 breaks fragments from an annular area which surrounds and forms a radial extension of the central working range. The fragments which are thus cut loose fall down and are then conveyed to the mouth of the tunnel by known conveyor means. The tool holders 15, 16 may be axially staggered as shown in FIG. 3 where shaft 14 is longer than the shaft 14 of FIG. 1 to cause the rotating tool holder 15 to act in a plane in advance of tool holder 16.

According to FIGS. 5 and 6 the tools 17 may consist of round or edged steel bars having chisellike cutting edges for removing earth, clay, sand and the like. Hard metal-tipped chisel tools of the type shown are also used for rock of higher strength. The tools 17 are fixed by set screws in sleeves 25 which are integral with brackets 26 which are fixed to holders 15 and 16.

The bearing stand 1 is rigidly affixed on a chassis 29, which rests at its front end on two wheels 30, which have a common axle 31. The wheels 30 are disposed in the chassis below the bearing stand 1 and are slowly and continuously rotated by a hydraulic drive to impart the necessary feeding movement to the tool holders 15, 16 (FIG. 7). The rear end of the chassis is supported by a roller 32 or a skid (not shown), which is carried by a fork 34 (FIG. 3), which is vertically adjustable in the chassis by means of a screw spindle 33. The hydraulic drive (FIG. 7) consists, e.g., of a double cylinder 35, 36, which accommodates two pistons 37, 38 for joint reciprocation by a piston rod 39, which is formed with a rack in mesh with a pinion 40, which is freely rotatably carried on the shaft 41 and rotates the same by means of a one-way drive. The shaft 41 is rotatably carried in a casing 42 and carries a sprocket wheel 43, which is positively connected by a chain 44 (FIG. 1) to a sprocket wheel 45 affixed to the axle 31 of the chassis. The cylinders 37 and 38 are connected (FIG. 7) by pressure conduits 37a, 38a and control valves 54, 55, respectively, to a pump 56, which has an oil reservoir 57 with a return conduit 58, which leads to the manually operable control valves 54 and 55. Thus, the pump 56 can be caused to supply a liquid pressure fluid, such as oil, into the cylinders 35, 36 for moving the two pistons 37, 38 in one or the other direction. In this way a feeding movement can be imparted to the tool holders 15, 16 by means of the gear-wheel 40 and the chain drive 43 to 45. The amount or rate of feed is adjustable by a control device, known per se, which is operable by means of the hand wheel 46, e.g., through the intermediary of the chain drive 47, 48, 49.

The carrier shown in FIG. 4 enables the provision of two tool holders of equal size on the two shafts rotatably carried by the carrier and the working of said tool holders in the same sense of rotation or to use two tool holders driven in mutually opposite senses, as shown. In the former case the carrier is closed by two small cover caps, in the second case it is closed by one small cover cap and one large cover cap 20 provided with a gear-wheel 19.

What is claimed is:

In a tunnel driving machine for driving tunnels in coal and other solid rock, a chassis with wheels, a drive motor carried by the chassis, a transmission arranged to be driven by the motor, a main drive shaft extending in the feeding direction and driven by said transmission, a hollow shaft concentrically surrounding said main drive shaft, reduction gear means transmitting the drive from said main to said hollow shaft to rotate the latter at a fraction of the speed of the main drive shaft, a driving gear-wheel affixed to the main drive shaft, a casinglike carrier housing said driving gear-wheel and affixed to the hollow shaft to rotate therewith, said carrier having at least one outer end which is open in a radial direction, two gear shafts carried in the carrier and respectively located at opposite sides of the hollow shaft at a radial distance therefrom, a gear-wheel affixed on one of said gear shafts and meshing with said driving gear-wheel, a tool holder affixed to said one gear shaft and having a working range which includes the center of the cross-section of the tunnel, an idler gear-wheel affixed to the other gear shaft and also meshing with said driving gear-wheel, a casing cap adapted to be mounted and to be detachably affixed to the open end of the casinglike carrier, a gear shaft rotatably carried in the casing cap and extending parallel to the main drive shaft, a gear wheel affixed to the gear shaft within the casing cap and meshing with the idler wheel and rotated thereby in the sense of rotation of the driving gear-wheel, a tool holder affixed on the gear shaft of the casing cap and rotating in the opposite direction to the first-mentioned tool holder so that both tool holders offset at least in part the torques exercised on the rotating carrier.

References Cited in the file of this patent

UNITED STATES PATENTS

| | | |
|---|---|---|
| 1,812,719 | Schroeder | June 30, 1931 |
| 2,404,605 | Thompson | July 23, 1946 |
| 2,466,709 | Karr | Apr. 12, 1949 |
| 2,760,766 | Mayo | Aug. 28, 1956 |
| 2,802,653 | Budd | Aug. 13, 1957 |
| 2,836,408 | Barrett | May 27, 1958 |
| 2,850,272 | Joy | Sept. 2, 1958 |

FOREIGN PATENTS

| | | |
|---|---|---|
| 915,980 | France | Aug. 5, 1946 |
| 1,129,571 | France | Sept. 10, 1956 |
| 620,915 | Germany | Nov. 6, 1935 |